(12) United States Patent
Saloway

(10) Patent No.: US 10,703,629 B2
(45) Date of Patent: Jul. 7, 2020

(54) METHOD AND APPARATUS FOR PRODUCING A HYDROGEN-CONTAINING PRODUCT

(71) Applicant: Air Products and Chemicals, Inc., Allentown, PA (US)

(72) Inventor: Simon Craig Saloway, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 111 days.

(21) Appl. No.: 16/131,181

(22) Filed: Sep. 14, 2018

(65) Prior Publication Data

US 2019/0023567 A1    Jan. 24, 2019

Related U.S. Application Data

(62) Division of application No. 15/148,207, filed on May 6, 2016, now Pat. No. 10,308,508.

(51) Int. Cl.
*C01B 3/38* (2006.01)
*B01J 7/00* (2006.01)
*B01J 8/02* (2006.01)
*B01J 8/06* (2006.01)

(52) U.S. Cl.
CPC ............................. *C01B 3/38* (2013.01); *B01J 7/00* (2013.01); *B01J 8/025* (2013.01); *B01J 8/062* (2013.01); *B01J 2208/0053* (2013.01); *B01J 2208/00176* (2013.01); *B01J 2208/00274* (2013.01); *B01J 2208/00504* (2013.01); *B01J 2219/0004* (2013.01); *C01B 2203/0233* (2013.01); *C01B 2203/0811* (2013.01); *C01B 2203/0883* (2013.01); *C01B 2203/1241* (2013.01)

(58) Field of Classification Search
CPC ............ C01B 2203/0233; C01B 3/382; C01B 2203/0883; C01B 2203/142; C01B 3/384; C01B 2203/0816; C01B 2203/0811; C01B 3/38; C01B 2203/0244; C01B 2203/1058; C01B 2203/1258
See application file for complete search history.

(56) References Cited

U.S. PATENT DOCUMENTS

| | | | |
|---|---|---|---|
| 8,956,587 B1* | 2/2015 | Peng | ........................ C01B 3/384 423/650 |
| 2008/0232729 A1 | 9/2008 | Petitjean et al. | |
| 2009/0094894 A1 | 4/2009 | Genkin | |
| 2009/0230359 A1* | 9/2009 | Guvelioglu | ............. C01B 3/384 252/373 |

(Continued)

FOREIGN PATENT DOCUMENTS

| | | |
|---|---|---|
| EP | 2876079 A1 | 5/2015 |
| WO | 2010086635 A1 | 8/2010 |

(Continued)

*Primary Examiner* — Imran Akram
(74) *Attorney, Agent, or Firm* — Larry S. Zelson

(57) ABSTRACT

Process and apparatus for producing a hydrogen-containing product by steam-hydrocarbon reforming of multiple hydrocarbon feedstocks in a production facility utilizing a prereformer in addition to the primary reformer. The temperature of the reactant mixture introduced into the prereformer is controlled depending on the composition of the reactant mixture fed to the prereformer.

10 Claims, 1 Drawing Sheet

(56) References Cited

U.S. PATENT DOCUMENTS

| | | | |
|---|---|---|---|
| 2009/0232729 A1* | 9/2009 | Genkin | C01B 3/384 423/651 |
| 2011/0085967 A1* | 4/2011 | Raybold | C01B 3/382 423/652 |
| 2011/0146991 A1* | 6/2011 | Palamara | C01B 3/384 166/303 |
| 2011/0171117 A1* | 7/2011 | Gorski | C01B 3/26 423/650 |
| 2012/0039794 A1 | 2/2012 | Catchpole | |
| 2013/0309163 A1* | 11/2013 | Peng | C01B 3/384 423/650 |
| 2014/0084213 A1 | 3/2014 | MacMurray et al. | |
| 2014/0171714 A1 | 6/2014 | Tromeur | |
| 2014/0264175 A1* | 9/2014 | Perry | B01J 19/0093 252/373 |
| 2018/0215641 A1* | 8/2018 | Kang | F23K 5/007 |

FOREIGN PATENT DOCUMENTS

| | | |
|---|---|---|
| WO | 2010120962 A1 | 10/2010 |
| WO | 2012057922 A1 | 5/2012 |

* cited by examiner

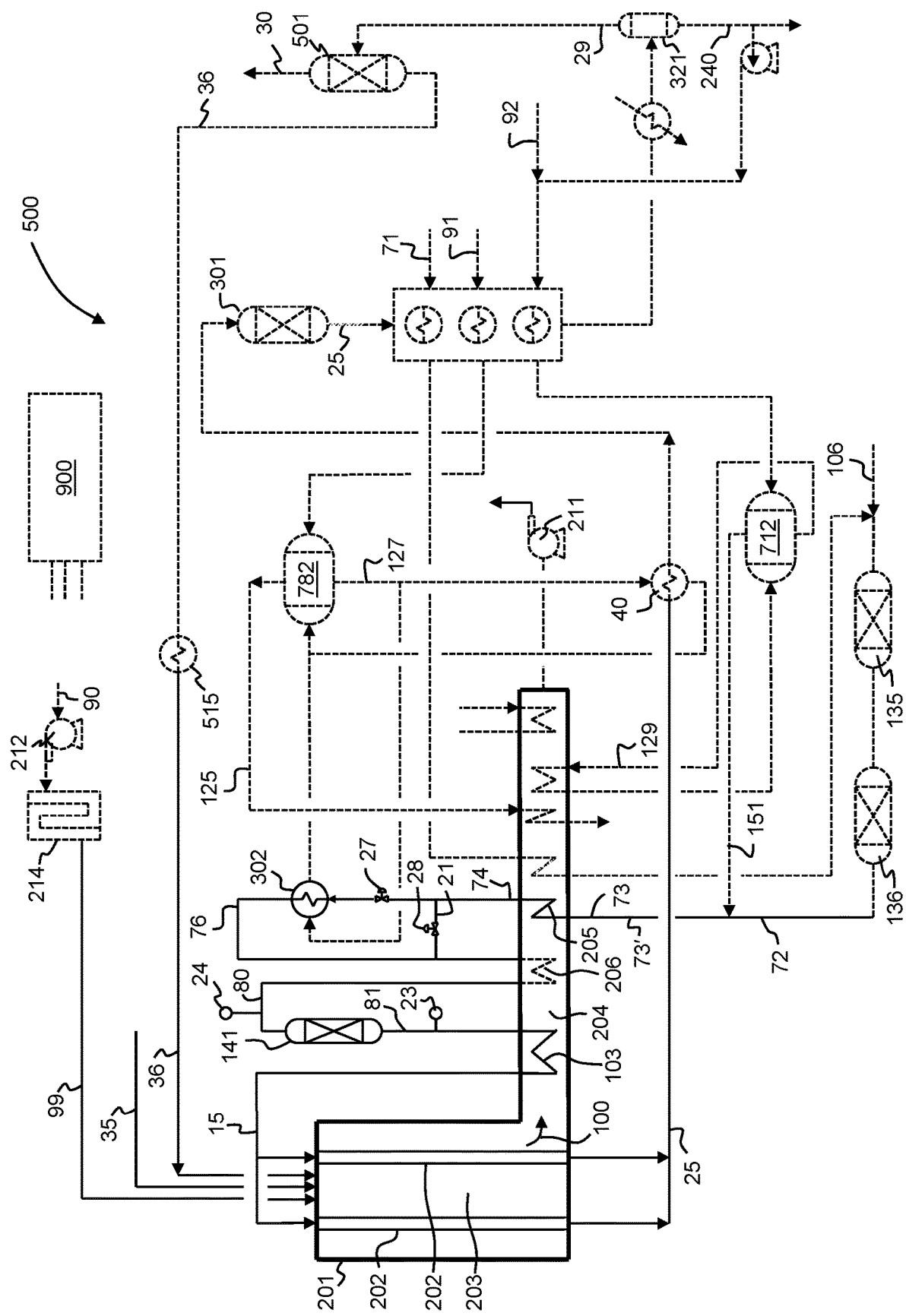

METHOD AND APPARATUS FOR PRODUCING A HYDROGEN-CONTAINING PRODUCT

CROSS-REFERENCE TO RELATED APPLICATIONS

The present application is a divisional application and claims the benefit of priority under 35 USC 120 of U.S. application Ser. No. 15/148,207, filed May 6, 2016. The disclosure of the prior application is considered part of and is incorporated by reference in the disclosure of this application.

BACKGROUND

The present invention relates to a process for reforming methane and higher hydrocarbons to produce a synthesis gas (syngas) product and/or a hydrogen product. A synthesis gas product is a product comprising primarily CO and $H_2$. Reformed hydrocarbons may be further reacted in one or more shift reactors to form additional $H_2$ in the process stream and separated in a separation unit, such as a pressure swing adsorption unit, to form a $H_2$ product.

Synthesis gas is conventionally used to produce synthesis gas products such as synthetic crude, or further upgraded to form intermediate or end products, for example lubricant basestock, lubricants, greases, middle distillate fuels, diesel, linear alkylbenzenes aviation and jet fuels, gasoline, and other chemicals, i.e. normal- and iso-paraffinic solvents. The synthesis gas may also be used to produce one or more oxygenates, for example, ethers and/or alcohols.

Synthesis gas (including hydrogen) can be produced from methane-containing feedstocks by any number of primary synthesis gas generation reactors. For example, synthesis gas can be produced in a steam methane reformer (SMR), an endothermic reactor where reaction is carried out either in heat exchange reactors, or by other means where substantial heat may be transferred to the reacting fluid, such as in the case of autothermal reforming (ATR), where a portion of the feedstock is combusted inside the reactor to provide heat for steam reforming either subsequently or in the same location as the combustion.

Various feedstocks can be used to produce synthesis gas and industry desires the capability to process multiple feedstocks. Industry desires the flexibility to switch between various hydrocarbon feedstocks, such as natural gas, liquefied petroleum gas (LPG), naphtha, or mixtures thereof, due to changing availability and relative cost of each hydrocarbon feedstock. Industry desires the ability to switch from one feedstock to another during operation without shutting down the reactor. For example, a synthesis gas producer may desire to use natural gas for 6 months, naphtha for 3 months, and then a mixture of natural gas and naphtha for 2 months. Industry desires to be able to process any available hydrocarbon feedstock, while maintaining high energy efficiency, avoiding overheating, and avoiding carbon formation in the primary synthesis gas reactor.

In addition to being able to process multiple feedstocks, industry desires to be able to process a feedstock where the composition, particularly the C2+ hydrocarbon concentration in the feedstock, varies over time. For example, synthesis gas may be produced from a refinery offgas where the C2+ hydrocarbon concentration varies from 2 vol. % to 15 vol. % depending on the refinery operation.

If the feedstock contains higher hydrocarbons than methane, that is, hydrocarbons having 2 or more carbon atoms (C2+ hydrocarbons) are used in the reforming process, the risk for catalyst deactivation by carbon deposition in the primary synthesis gas generation reactor is increased. Industry desires to avoid carbon formation in the synthesis gas generation reactor.

In order to reduce the risk of carbon deposition in the primary synthesis gas generation reactor, hydrogen and synthesis gas production processes may employ at least one catalytic reactor prior to the primary synthesis gas generation reactor where the catalytic reactor is operated at conditions less prone to hydrocarbon cracking than the primary synthesis gas generation reactor. These reactors positioned before the primary synthesis gas generation reactors are referred to as pre-reformers. Pre-reformers can be operated adiabatically or convectively heated by indirect heat transfer with combustion products gases from the primary synthesis gas generation reactor.

A pre-reformer can provide several benefits. A pre-reformer can improve the energy efficiency of the overall reforming process (for example by allowing a lower steam-to-carbon molar ratio for the feed), reduce the capital cost of the primary reformer, allow for higher preheat temperatures to the primary reformer without carbon formation on the catalyst in the catalyst-containing reformer tubes, and reduce involuntary steam production.

In hydrogen and synthesis gas production processes employing pre-reformers and steam methane reformers, the hydrocarbon feedstock may be mixed with hydrogen for a resultant stream having 1 to 5 mole % hydrogen, and subsequently subjected to a hydrodesulphurization (HDS) pretreatment to remove sulphur. The hydrocarbon feedstock may also be treated to remove olefins in a hydrogenation reactor. In case $H_2$ is present in the feedstock, additional $H_2$ might not be added.

For steam reforming of heavy naphthas, hydrogen concentrations as high as about 50 mole % $H_2$ are known where the mixture is subsequently pretreated in a hydrodesulphurization unit and/or a hydrogenation reactor. Even higher hydrogen concentrations are possible depending on the feedstock provided.

The feedstock, after pretreating, is combined with superheated steam to form "mixed feed" having a prescribed steam-to-carbon molar ratio. The steam-to-carbon molar ratio, S/C, is the ratio of the molar flow rate of steam in the mixed feed to the molar flow rate of hydrocarbon-based carbon in the mixed feed. The "steam-to-carbon molar ratio" is a conventional term used in the art.

The steam-to-carbon molar ratio for steam methane reforming of natural gas typically ranges from 2 to 5, but can be as low as 1.5. The steam-to-carbon molar ratio is generally higher for steam methane reforming of feedstock containing a greater amount of higher hydrocarbons, for example, propane, butane, propane/butane mixtures, and naphtha.

Higher steam flow rates are used to suppress carbon formation and enhance the steam reforming reaction. However, higher steam-to-carbon molar ratios disadvantageously decrease the energy efficiency of the reforming process. Industry desires to improve the energy efficiency of steam-hydrocarbon reforming systems.

While there are significant benefits when using a prereformer, it is known that when the feed to the prereformer contains a significant amount of higher hydrocarbons, as for example when naphtha is used to form the feed, the reaction in the prereformer is exothermic, while when the feed to the prereformer contains few higher hydrocarbons, as for example when natural gas is used to form the feed to the prereformer, the reaction in the prereformer is endothermic.

When processing feeds that result in an exothermic reaction in the prereformer there is a risk of overheating downstream heating coils, overheating the reactor (reformer) inlet, overheating the reactor (reformer), and cracking the feed thereby forming solid carbon. Additional steam can be added to the feed to reduce the risk of overheating and solid formation, but this reduces the efficiency of the overall process.

Industry desires to avoid overheating the prereformer reactor while maintaining high energy efficiency.

BRIEF SUMMARY

The present invention relates to a steam-hydrocarbon reforming process utilizing a pre-reformer.

There are several aspects of the invention as outlined below. In the following, specific aspects of the invention are outlined below. The reference numbers and expressions set in parentheses are referring to an example embodiment explained further below with reference to the FIGURE. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. An apparatus for producing a hydrogen-containing product, the apparatus comprising:
  a catalyst-containing reactor (141) having an inlet and an outlet, the inlet for receiving a feed (80), the outlet for discharging an effluent (81) formed from the feed (80);
  a reformer furnace (201) comprising a combustion section (203) and a heat exchanger section (204), the combustion section (203) containing a plurality of catalyst-containing reformer tubes (202), the plurality of catalyst-containing reformer tubes (202) operatively disposed to receive at least a portion of the effluent (81) discharged from the catalyst-containing reactor (141), the heat exchanger section (204) containing a plurality of heat exchangers, the heat exchanger section (204) operatively disposed to receive a combustion product gas (100) from the combustion section (203);
  a first heat exchanger (205) of the plurality of heat exchangers operatively configured to heat a reactant gas mixture (73) by indirect heat exchange with the combustion product gas (100); and
  a heat exchanger (302) having an inlet and an outlet, the heat exchanger (302) operatively configured to provide on demand cooling of at least a fraction of the reactant gas mixture (73) from the first exchanger (205) and discharge the at least a fraction of the reactant gas mixture (73) as an effluent (76) from the outlet of the heat exchanger (302), wherein the inlet of the catalyst-containing reactor (141) is operatively disposed to receive at least a portion of the effluent (76) from the outlet of the heat exchanger (302) as at least a portion of the feed (80) to the catalyst-containing reactor (141).

Aspect 2. The apparatus of aspect 1, the apparatus further comprising:
  a bypass conduit (21); and
  one or more valves (27, 28), the one or more valves (27, 28) capable of directing separate fractions of the reactant gas mixture (73) from the first heat exchanger (205) to the heat exchanger (302) and the bypass conduit (21);
  wherein the heat exchanger (302) is operatively configured to cool any fraction of reactant gas mixture (73) that passes through the heat exchanger (302) thereby providing on demand cooling; and
  wherein the bypass conduit (21) is operatively disposed to direct any fraction of the reactant gas mixture (73) passing through the bypass conduit (21) to the inlet of the catalyst-containing reactor (141) as at least a second portion of the feed to the catalyst-containing reactor (141) without passing that fraction of the reactant gas mixture (73) through the heat exchanger (302).

Aspect 3. The apparatus of aspect 2 further comprising:
  at least one of (i) a temperature sensor (23) operatively disposed to measure temperatures relatable to a temperatures of the effluent (81) from the catalyst-containing reactor (141) and provide signals in response thereto, and (ii) a composition measurement unit operatively disposed to measure compositions relatable to the compositions of the reactant gas mixture (73) and provide signals in response thereto; and
  a controller (900) operatively configured to receive the signals from the at least one of the temperature sensor (23) and the composition measurement unit, the controller (900) operatively configured to generate control signals in response to receiving the signals;
  wherein the one or more valves (27, 28) are operatively configured to receive the control signals generated by the controller (900) and respond to the control signals from the controller (900).

Aspect 4. The apparatus of aspect 2 or aspect 3 further comprising:
  a second heat exchanger (206) of the plurality of heat exchangers operatively configured to receive that fraction of the reactant gas mixture (73) passed through the bypass conduit (21) and heat that fraction of the reactant gas mixture passed through the bypass conduit (21) by indirect heat exchange with the combustion product gas (100) in the second heat exchanger (206) of the plurality of heat exchangers wherein the inlet of the catalyst-containing reactor (141) is operatively disposed to receive at least a portion of that fraction of the reactant gas mixture (73) passed through the bypass conduit (21) after that at least a portion of that fraction of the reactant gas mixture (73) is heated by indirect heat exchange with the combustion product gas (100) in the second heat exchanger (206) of the plurality of heat exchangers.

Aspect 5. The apparatus of the preceding aspect wherein:
  the second heat exchanger (206) of the plurality of heat exchangers operatively configured to heat the at least a portion of the effluent (76) discharged from the outlet of the heat exchanger (302) by indirect heat exchange with the combustion product gas (100) wherein the inlet of the catalyst-containing reactor (141) is operatively disposed to receive the at least a portion of the effluent (76) from the outlet of the heat exchanger (302) after the at least a portion of the effluent (76) is heated by indirect heat exchange with the combustion product gas (100) in the second heat exchanger (206) of the plurality of heat exchangers.

Aspect 6. The apparatus of any one of aspects 1 to 3 further comprising:
  a second heat exchanger (206) of the plurality of heat exchangers operatively configured to heat the at least a portion of the effluent (76) discharged from the outlet of the heat exchanger (302) by indirect heat exchange with the combustion product gas (100) wherein the inlet of the catalyst-containing reactor (141) is operatively disposed to receive the at least a portion of the effluent (76) from the outlet of the heat exchanger (302) after the at least a portion of the effluent (76) is heated by indirect heat exchange with the combustion product gas (100) in the second heat exchanger (206) of the plurality of heat exchangers.

Aspect 7. The apparatus of any one of the preceding aspects wherein the heat exchanger (302) is operatively configured to cool any fraction of reactant gas mixture (73) that passes through the heat exchanger (302) by indirect heat exchange with boiler feed water (127) and/or a feedstock stream.

Aspect 8. The apparatus of the preceding aspect further comprising a steam drum (782) wherein the steam drum (782) is operatively disposed to receive the boiler feed water (127) from the heat exchanger (302).

Aspect 9. The apparatus of any one of aspects 4 to 8 further comprising:
  a third heat exchanger (103) of the plurality of heat exchangers operatively configured to heat the at least a portion of the effluent (81) discharged from the catalyst-containing reactor (141) by indirect heat exchange with the combustion product gas (100), wherein the plurality of catalyst-containing reformer tubes (202) are operatively disposed to receive the at least a portion of the effluent (81) discharged from the catalyst-containing reactor (141) after the at least a portion of the effluent (81) is heated by indirect heat exchange with the combustion product gas (100) in the third heat exchanger (103) of the plurality of heat exchangers.

Aspect 10. The apparatus of any one of the preceding aspects further comprising:
  a pressure swing adsorption unit (501) operatively disposed to receive at least a portion of a reformate (25) discharged from the plurality of catalyst-containing reformer tubes (202), the reformate (25) formed from the at least a portion of the effluent (81) discharged from the catalyst-containing reactor (141), the pressure swing adsorption unit (501) operatively configured to separate the at least a portion of the reformate (25) to form a hydrogen product gas (30) and a pressure swing adsorption unit by-product gas (36).

Aspect 11. A process for producing a hydrogen-containing product,
  wherein during a first time period, the process comprises:
    heating a first reactant gas mixture (73) comprising steam and a first group of hydrocarbons;
    passing a first fraction or all of the first reactant gas mixture (73) after heating to a heat exchanger (302) thereby cooling the first fraction or all of the first reactant gas mixture (73) in the heat exchanger (302), the first fraction or all of the first reactant gas mixture (73) passed to the heat exchanger (302) having a mass flow rate, $M_{1,HX}$;
    passing a second fraction or none of the first reactant gas mixture (73) after heating to a bypass conduit (21) that bypasses the heat exchanger (302), the second fraction or none of the first reactant gas mixture (73) having a mass flow rate, $M_{1,BP}$, where $M_{1,BP}$ is zero when none of the first reactant gas mixture (73) is passed to the bypass conduit (21);
    passing the first fraction or all of the first reactant gas mixture (73) from the heat exchanger (302) to the catalyst-containing reactor (141), introducing the first fraction or all of the first reactant gas mixture (73) into the catalyst-containing reactor (141) as at least a portion of a feed (80) to the catalyst-containing reactor (141), the feed (80) to the catalyst-containing reactor (141) having a mass flow rate, $M_{1,T}$, reacting the first fraction or all of the first reactant gas mixture (73) in the catalyst-containing reactor (141) (thereby decreasing the amount of C2+ hydrocarbons in the first reactant gas mixture (73)), and withdrawing an effluent (81) (containing a decreased amount of C2+ hydrocarbons compared to the first reactant gas mixture (73)) formed from at least the first fraction or all of the first reactant gas mixture (73) from the catalyst-containing reactor (141);
    passing at least a portion of the effluent (81) (formed during the first time period from the at least the first fraction or all of the first reactant gas mixture (73)) from the catalyst-containing reactor (141) to a reformer furnace (201), introducing the at least a portion of the effluent (81) (formed during the first time period) into a plurality of catalyst-containing reformer tubes (202) in the reformer furnace (201) as a reformer feed gas mixture (15), reacting the reformer feed gas mixture (15) in a reforming reaction under reaction conditions effective to form a reformate (25) comprising $H_2$, CO, $CH_4$, and $H_2O$, and withdrawing the reformate (25) (formed during the first time period) from the plurality of catalyst containing reformer tubes (202);
    combusting a first quantity of fuel (35, 36) with a first quantity of oxidant gas (99) in a combustion section (203) of the reformer furnace (201) external to the plurality of catalyst-containing reformer tubes (202) under conditions effective to combust the fuel (35, 36) to form a first quantity of combustion product gas (100) and generate heat to supply energy for reacting the reformer feed gas mixture (15) inside the plurality of catalyst-containing reformer tubes (202), and withdrawing the first quantity of the combustion product gas (100) from the combustion section (203);
  wherein during a second time period, the process comprises:
    heating a second reactant gas mixture (73') comprising steam and a second group of hydrocarbons;
    passing a first fraction or all of the second reactant gas mixture (73') after heating through the bypass conduit (21) that bypasses the heat exchanger (302), the first fraction of the second reactant gas mixture (73') having a mass flow rate, $M_{2,BP}$;
    passing a second fraction or none of the second reactant gas mixture (73') after heating to the heat exchanger (302), the second fraction or none of the second reactant gas mixture (73') having a mass flow rate, $M_{2,HX}$, where $M_{2,HX}$ is zero when none of the second reactant gas mixture (73') is passed to the heat exchanger (302), wherein the second fraction of the second reactant gas mixture (73') is cooled in the heat exchanger (302) if the second fraction is passed to the heat exchanger (302);
    passing the first fraction or all of the second reactant gas mixture (73') from the bypass conduit (21) to the catalyst-containing reactor (141), introducing the first fraction or all of the second reactant gas mixture (73') into the catalyst-containing reactor (141) as at least a portion of a feed (80) to the catalyst-containing reactor (141) (during the second time period), the feed (80) to the catalyst-containing reactor (141)

having a mass flow rate, $M_{2,T}$, reacting the first fraction or all of the second reactant gas mixture (73') in the catalyst-containing reactor (141), and withdrawing an effluent (81) formed from at least the first fraction or all of the second reactant gas mixture (73') from the catalyst-containing reactor (141);

passing at least a portion of the effluent (81) (formed during the second time period) from the catalyst-containing reactor (141) to the reformer furnace (201), introducing the at least a portion of the effluent (81) (formed during the second time period) into a plurality of catalyst-containing reformer tubes (202) in the reformer furnace (201) as a reformer feed gas mixture (15) (during the second time period), reacting the reformer feed gas mixture (15) under reaction conditions effective to form a reformate (25) comprising $H_2$, CO, $CH_4$, and $H_2O$ (during the second time period), and withdrawing the reformate (25) (formed during the second time period) from the plurality of catalyst containing reformer tubes (202); and combusting a second quantity of fuel (35, 36) with a second quantity of oxidant gas (99) in the combustion section (203) of the reformer furnace (201) external to the plurality of catalyst-containing reformer tubes (202) under conditions effective to combust the second quantity of fuel (35, 36) to form a second quantity of combustion product gas (100) and generate heat to supply energy for reacting the reformer feed gas mixture (15) inside the plurality of catalyst-containing reformer tubes (202) (during the second time period), and withdrawing the second quantity of the combustion product gas (100) from the combustion section (203);

wherein the first reactant gas mixture (73) has a composition such that when reacted in the catalyst-containing reactor (141), the first reactant gas mixture (73) reacts exothermically;

wherein the second reactant gas mixture (73') has a composition such that when reacted in the catalyst-containing reactor (141), the second reactant gas mixture (73') reacts endothermically; and wherein $$\frac{M_{1,HX}}{M_{1,T}} > \frac{M_{2,HX}}{M_{2,T}}.$$

Aspect 12. The process of aspect 11 wherein during the first time period the process further comprises:
passing the second fraction of the first reactant gas mixture (73) from the bypass conduit (21) to the catalyst-containing reactor (141), introducing the second fraction of the first reactant gas mixture (73) into the catalyst-containing reactor (141) as at least another portion of the feed (80) to the catalyst-containing reactor (141), reacting the second fraction of the first reactant gas mixture (73) in the catalyst-containing reactor (141), wherein the effluent (81) from the catalyst-containing reactor (141) is also formed from the second fraction of the first reactant gas mixture (73).

Aspect 13. The process of aspect 11 or aspect 12 wherein during the second time period the process further comprises:
passing the second fraction of the second reactant gas mixture (73') from the heat exchanger (302) to the catalyst-containing reactor (141), introducing the second fraction of the second reactant gas mixture (73') into the catalyst-containing reactor (141) as at least another portion of the feed (80) to the catalyst-containing reactor (141) (during the second time period), reacting the second fraction of the second reactant gas mixture (73') in the catalyst-containing reactor (141), wherein the effluent (81) from the catalyst-containing reactor (141) is also formed from the second fraction of the second reactant gas mixture (73') (during the second time period).

Aspect 14. The process of any one of aspects 11 to 13 wherein in the step of heating the first reactant gas mixture (73), the first reactant gas mixture (73) is heated by indirect heat exchange with the combustion product gas (100) (e.g. in a first heat exchanger (205) of a plurality of heat exchangers in a heat exchanger section (204) of the reformer furnace (201)) prior to passing the first fraction or all of the first reactant gas mixture (73) to the heat exchanger (302) and prior to passing the second fraction of the first reactant gas mixture (73), if nonzero, to the bypass conduit (21).

Aspect 15. The process of any one of aspects 11 to 14 wherein in the step of heating the second reactant gas mixture (73'), the second reactant gas mixture (73') is heated by indirect heat exchange with the combustion product gas (100) (e.g. in the first heat exchanger (205) of the plurality of heat exchangers in the heat exchanger section (204) of the reformer furnace (201)) prior to passing the first fraction or all of the second reactant gas mixture (73') through the bypass conduit (21) that bypasses the heat exchanger (302) and prior to passing the second fraction of the second reactant gas mixture (73'), if nonzero, to the heat exchanger (302).

Aspect 16. The process of any one of aspects 11 to 15 wherein the first fraction or all of the first reactant gas mixture (73) is cooled in the heat exchanger (302) by indirect heat exchange with boiler feed water (127) and/or a feedstock stream.

Aspect 17. The process of any one of aspects 11 to 16 wherein the second fraction of the second reactant gas mixture (73') is cooled in the heat exchanger (302) by indirect heat exchange with boiler feed water (127) and/or a feedstock stream.

Aspect 18. The process of any one of aspects 11 to 17 wherein when passing the first fraction or all of the first reactant gas mixture (73) from the heat exchanger (302) to the catalyst-containing reactor (141), the first fraction or all of the first reactant gas mixture (73) is heated by indirect heat exchange with the combustion product gas (100) (e.g. in a second heat exchanger (206) of the plurality of heat exchangers in the heat exchanger section (204) of the reformer furnace (201)).

Aspect 19. The process of any one of aspects 11 to 18 wherein when passing the first fraction or all of the second reactant gas mixture (73') from the bypass conduit (21) to the catalyst-containing reactor (141), the first fraction or all of the second reactant gas mixture (73') is heated by indirect heat exchange with the combustion product gas (100) (e.g. in the second heat exchanger (206) of the plurality of heat exchangers in the heat exchanger section (204) of the reformer furnace (201)).

Aspect 20. The process of any one of aspects 11 to 19 wherein when passing the second fraction of the first reactant gas mixture (73) from the bypass conduit (21) to the catalyst-containing reactor (141), the second fraction of the first reactant gas mixture (73) is heated by indirect heat exchange with the combustion product gas (100) (e.g. in a second heat exchanger (206) of the plurality of heat exchangers in the heat exchanger section (204) of the reformer furnace (201)).

Aspect 21. The process of any one of aspects 11 to 20 wherein when passing the second fraction of the second reactant gas mixture (73') from the heat exchanger (302) to the catalyst-containing reactor (141), the second fraction of the second reactant gas mixture (73') is heated by indirect heat exchange with the combustion product gas (100) (e.g. in the second heat exchanger (206) of the plurality of heat exchangers in the heat exchanger section (204) of the reformer furnace (201)).

Aspect 22. The process of any one of aspects 11 to 21 wherein the first fraction of the first reactant gas mixture (73) from the heat exchanger (302) and the second fraction of the first reactant gas mixture (73) from the bypass conduit (21) are combined and passed to the catalyst-containing reactor (141) as a combined first reactant gas mixture (73).

Aspect 23. The process of aspect 22 wherein when the combined first reactant gas mixture (73) is passed to the catalyst-containing reactor (141), the combined first reactant gas mixture (73) is heated by indirect heat exchange with the combustion product gas (100) (e.g. in the second heat exchanger (206) in the heat exchange section (204) of the reformer furnace (201)).

Aspect 24. The process of any one of aspects 11 to 23 wherein the first fraction of the second reactant gas mixture (73') from bypass conduit (21) and the second fraction of the second reactant gas mixture (73') from the heat exchanger (302) are combined and passed to the catalyst-containing reactor (141) as a combined second reactant gas mixture (73').

Aspect 25. The process of aspect 24 wherein when the combined second reactant gas mixture (73') is passed to the catalyst-containing reactor (141), the combined second reactant gas mixture (73') is heated by indirect heat exchange with the combustion product gas (100) (e.g. in the second heat exchanger (206) of the plurality of heat exchangers in the heat exchange section (204) of the reformer furnace (201)).

Aspect 26. The process of any one of aspects 11 to 25 wherein when the at least a portion of the effluent (81) from the catalyst-containing reactor (141) (during the first time period) is passed from the catalyst-containing reactor (141) to the reformer furnace (201), the at least a portion of the effluent (81) from the catalyst-containing reactor (141) is heated by indirect heat exchange with the combustion product gas (100) (e.g. in a third heat exchanger (103) of the plurality of heat exchangers in the heat exchanger section (204) of the reformer furnace (201)).

Aspect 27. The process of any one of aspects 11 to 26 wherein when the at least a portion of the effluent (81) from the catalyst-containing reactor (141) (during the second time period) is passed from the catalyst-containing reactor (141) to the reformer furnace (201), the at least a portion of the effluent (81) from the catalyst-containing reactor (141) is heated by indirect heat exchange with the combustion product gas (100) (e.g. in the third heat exchanger (103) of the plurality of heat exchangers in the heat exchanger section (204) of the reformer furnace (201)).

Aspect 28. The process of any one of aspects 11 to 27 further comprising:

passing the reformate (25) from the plurality of catalyst-containing reformer tubes (202) to a pressure swing adsorption unit (501) as a pressure swing adsorption unit feed (29), separating the pressure swing adsorption unit feed to form a hydrogen product gas (30) and a pressure swing adsorption unit by-product gas (36).

Aspect 29. The process of any one of aspects 11 to 28 further comprising:

passing the reformate (25) (formed during the second time period) from the plurality of catalyst-containing reformer tubes (202) to a pressure swing adsorption unit (501) as a pressure swing adsorption unit feed (29), separating the pressure swing adsorption unit feed to form a hydrogen product gas (30) and a pressure swing adsorption unit by-product gas (36).

Aspect 30. The process of any one of aspects 11 to 29 further comprising:

determining that the first reactant gas mixture (73) has a composition such that when reacted in the catalyst-containing reactor (141), the first reactant gas mixture (73) reacts exothermically, and initiating the steps for the first time period responsive to determining that the first reactant gas mixture (73) has a composition such that when reacted in the catalyst-containing reactor (141), the first reactant gas mixture (73) reacts exothermically.

Aspect 31. The process of any one of aspects 11 to 30 further comprising:

determining that the second reactant gas mixture (73') has a composition such that when reacted in the catalyst-containing reactor (141), the second reactant gas mixture (73') reacts endothermically, and initiating the steps for the second time period responsive to determining that the second reactant gas mixture (73') has a composition such that when second reactant gas mixture is reacted in the catalyst-containing reactor (141), the second reactant gas mixture (73') reacts endothermically.

BRIEF DESCRIPTION OF SEVERAL VIEWS OF THE DRAWINGS

The sole FIGURE is a process flow diagram for a hydrogen production facility illustrating the present apparatus and suitable for carrying out the present process.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a fraction" means "a fraction or all."

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

The term "depleted" means having a lesser mole % concentration of the indicated component than the original stream from which it was formed. "Depleted" does not mean that the stream is completely lacking the indicated component.

The terms "rich" or "enriched" means having a greater mole % concentration of the indicated component than the original stream from which it was formed.

As used herein, "heat" and "heating" may include both sensible and latent heat and heating.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. water to steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon, kettle boiler, or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

Illustrative embodiments of the invention are described below. While the invention is susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

For the purposes of simplicity and clarity, detailed descriptions of well-known devices, circuits, and methods are omitted so as not to obscure the description of the present invention with unnecessary detail.

The present invention relates to a process and apparatus for producing a hydrogen-containing product. The hydrogen-containing product may be, for example, industrial-grade hydrogen or synthesis gas, which comprises hydrogen and carbon monoxide.

The process and apparatus are suitable for processing a hydrocarbon feed where the composition of the hydrocarbon feed varies. For example, the hydrocarbon feed to the process and apparatus during one time period could be formed from natural gas which contains a limited amount of C2+ hydrocarbons (so-called heavy hydrocarbons) and during another time period could be formed from a feedstock containing primarily C2+ hydrocarbons, e.g. naphtha, propane, ethane or other known heavy hydrocarbon feedstock used in steam-hydrocarbon reforming.

The process utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into reformate by reaction with steam over a catalyst. Reformate, also called synthesis gas, or syngas, as used herein is any mixture comprising hydrogen and carbon monoxide. The reforming reaction is an endothermic reaction and may be described generally as $C_nH_m + n H_2O \rightarrow n CO + (m/2+n) H_2$. Hydrogen is generated when reformate is generated.

The process and apparatus are described with reference to the sole FIGURE showing a process flow diagram for a production facility 500 for producing a hydrogen-containing product.

The apparatus comprises a catalyst-containing reactor 141 (i.e. a so-called preformer). The catalyst-containing reactor 141 has an inlet and an outlet, the inlet for receiving a feed, the outlet for discharging an effluent formed from the feed.

So-called "preformers" are well-known in the art. A preformer is a reactor containing catalyst suitable for catalyzing the reforming reaction. Steam 151 and a feedstock 71 comprising one or more hydrocarbons are contacted with the catalyst and reacted to a limited extent in the catalyst-containing reactor 141. Generally the higher hydrocarbons (e.g. C2+ hydrocarbons) are preferentially reacted compared to methane in the catalyst-containing reactor 141. The catalyst-containing reactor may be an adiabatic fixed bed reactor where heat is neither actively added nor removed. The catalyst-containing reactor may be a tubular reactor. The catalyst-containing reactor may be a convectively heated prereformer where the prereformer is heated by combustion product gases from the reformer furnace 201, reformate 25 from the reformer furnace 201, and/or steam from the process.

Catalyst used in the catalyst-containing reactor 141 may be any suitable reforming catalyst known in the art for so-called "prereforming." The catalyst may comprise at least one metal selected from a group consisting of nickel, cobalt, platinum, palladium, rhodium, ruthenium, iridium and mixtures thereof. A prereformer generally employs a different type of catalyst than the reformer furnace, for example a high activity, high nickel content catalyst.

Catalysts for prereforming are commercially available. Catalysts suitable for prereforming are discussed in U.S. Pat. Nos. 4,105,591, 3,882,636, 3,988,425, GB 969,637, GB 1,150,066, and GB 1,155,843.

Since the articles "a" and "the" mean one or more, more than one catalyst-containing reactor 141 and more than one catalyst may be used.

The apparatus comprises a reformer furnace 201. The reformer furnace 201 comprises a combustion section 203 and a heat exchanger section 204. The combustion section 203 contains a plurality of catalyst-containing reformer tubes 202. The plurality of catalyst-containing reformer tubes 202 are operatively disposed to receive at least a portion of the effluent discharged from the catalyst-containing reactor 141. The heat exchanger section 204 contains a plurality of heat exchangers and is operatively disposed to receive a combustion product gas 100 from the combustion section 203.

The reformer furnace 201 may be a steam methane reformer also called a primary reformer, catalytic steam-methane reformer, catalytic steam-hydrocarbon reformer, and is defined herein as any fired furnace used to convert feedstock containing elemental hydrogen and carbon into reformate by a reaction with steam over a catalyst with heat provided by combustion of a fuel.

Reformer furnaces with a plurality of catalyst-containing reformer tubes, i.e. tubular reformers, are well-known in the art. Any suitable number of catalyst-containing reformer tubes 202 may be used. Suitable materials and methods of construction are known. Catalyst in the catalyst-containing reformer tubes 202 may be any suitable reforming catalyst known in the art, for example, a supported catalyst comprising nickel.

The apparatus comprises a first heat exchanger 205 of the plurality of heat exchangers. The first heat exchanger 205 of the plurality of heat exchangers is operatively configured to heat a reactant gas mixture 73 by indirect heat exchange with the combustion product gas 100.

The apparatus comprises heat exchanger 302. Heat exchanger 302 has an inlet and an outlet. Heat exchanger 302 is operatively configured to provide on demand cooling of at least a fraction of the reactant gas mixture 73 from the first exchanger 205 and to discharge the at least a fraction of the reactant gas mixture 73 as an effluent from the outlet of the heat exchanger 302. The inlet of heat exchanger 302 is in downstream fluid communication of the first heat exchanger 205 of the plurality of heat exchangers.

The inlet of the catalyst-containing reactor 141 is operatively disposed to receive at least a portion of the effluent from the outlet of heat exchanger 302 as at least a portion of the feed to the catalyst-containing reactor 141; the inlet of the catalyst-containing reactor 141 is in downstream fluid communication of the outlet of heat exchanger 302.

The apparatus may comprise a bypass conduit 21 and one or more valves 27, 28 in order to facilitate the on demand cooling provided by heat exchanger 302. The bypass conduit 21 is operatively disposed to direct any fraction of the reactant gas mixture passing through the bypass conduit to the inlet of the catalyst-containing reactor 141 as at least a second portion of the feed to the catalyst-containing reactor 141 without passing that fraction of the reactant gas mixture through heat exchanger 302.

The one or more valves 27, 28 may be capable of directing separate fractions of the reactant gas mixture 73 from the first heat exchanger 205 to heat exchanger 302 and the bypass conduit 21. The one or more valves may be capable of directing one fraction of the reactant gas mixture 72 from the first heat exchanger 205 to heat exchanger 302, and another separate fraction from the first heat exchanger 205 to the bypass conduit 21. The one or more valves may also be capable, during a time period, of directing all of the reactant gas mixture 73 from the first heat exchanger 205 to heat exchanger 302 while none of the reactant gas mixture 72 is directed to the bypass conduit 21 during that time period. The one or more valves may also be capable, during another time period, of directing all of the reactant gas mixture 73 from the first heat exchanger 205 to bypass conduit 21 while none of the reactant gas mixture 73 is directed to the heat exchanger 302 during that other time period.

Heat exchanger 302 may be operatively configured to cool any fraction of the reactant gas mixture 72 that passes through heat exchanger 302 to provide on demand cooling. Heat exchanger 302 may be operatively configured to cool any fraction of reactant gas mixture 73 that passes through heat exchanger 302 by indirect heat transfer with boiler feed water 127. The apparatus may further comprise a steam drum 782 wherein the steam drum 782 is operatively disposed to receive the heated boiler feed water from the heat exchanger 302. Heat exchanger 302 may be operatively configured to cool any fraction of reactant gas mixture 73 that passes through heat exchanger 302 by indirect heat transfer with any other suitable stream, for example, feedstock stream 71.

The amount of reactant gas mixture 73 passed to either heat exchanger 302 or the bypass conduit 21 may be controlled using various sensors and a controller 900. The apparatus may further comprise at least one of a temperature sensor 23 and a composition measurement unit (not shown). The temperature sensor 23 may be operatively disposed to measure temperatures relatable to temperatures of the effluent discharged from the catalyst-containing reactor 141 where the temperature sensor generates electronic signals in response to measuring the temperature. The composition measurement unit may be operatively disposed to measure the composition of the reactant gas mixture and generate electronic signals in response to measuring the composition of the reactant gas mixture.

The apparatus may comprise a controller 900 operatively configured to receive signals from the temperature sensor 23 and/or the composition measurement unit. The controller 900 may be operatively configured to generate control signals in response to receiving signals from any sensors. The one or more valves may be operatively configured to receive the control signals generated by controller 900 and respond to the control signals from controller 900. The one or more valves may operate to a more open or full open position or to a more closed or full closed position in response to the control signals from controller 900.

The controller 900 may be connected to any sensors and/or valves by wireless and/or hard-wired means.

The apparatus may comprise a second heat exchanger 206 of the plurality of heat exchangers in the heat exchanger section 204 of the reformer furnace 201. The second heat exchanger 206 may be operatively configured to receive at least a portion of any fraction of the reactant gas mixture passed through the bypass conduit 21 and/or at least a portion the effluent 76 discharged from the outlet of heat exchanger 302; heat exchanger 206 may be in downstream fluid communication of heat exchanger 302 and bypass conduit 21. Heat exchanger 206 may be operatively configured to heat any reactant gas mixture passing through heat exchanger 206 by indirect heat exchange with combustion product gas 100. The inlet of the catalyst containing reactor 141 may be operatively disposed to receive at least a portion of any fraction of the reactant gas mixture passing through heat exchanger 206. While the FIGURE shows heat exchanger 206 upstream of heat exchanger 205 with respect to the flow of the combustion product gas 100 in the heat exchanger section 204 of the reformer furnace 201, heat exchanger 205 may alternatively be upstream of heat exchanger 206.

Heat exchanger 206 is optional. The effluent 76 discharged from the outlet of heat exchanger 302 may be blended with any fraction of the reactant gas mixture passed through the bypass conduit 21 and passed directly to the catalyst-containing reactor 141.

The apparatus may comprise a third heat exchanger 103 of the plurality of heat exchangers in the heat exchanger section 204 of the reformer furnace 201. Heat exchanger 103 may be operatively configured to heat at least a portion of the effluent discharged from the catalyst-containing reactor 141 by indirect heat exchange with the combustion product gas 100. The plurality of catalyst-containing reformer tubes may be operatively disposed to receive the at least a portion of the effluent 81 discharged from the catalyst-containing reactor 141 after the at least a portion of the effluent is heated by indirect heat exchange with the combustion product gas 100 in heat exchanger 103.

The heat exchanger section 204 of the reformer furnace 201 may comprise additional heat exchangers, for example, for making steam in steam drums 782, 712, heating combustion air 99 in heat exchanger 214, heating hydrocarbon feedstock 71, and superheating steam in a steam coil upstream of heat exchanger 103.

The apparatus may comprise additional processing units downstream of the plurality of catalyst-containing reformer tubes to further process reformate 25. A waste heat boiler 40 may be operatively disposed to receive reformate 25. One or more shift reactors 301 may be operatively disposed to receive reformate 25 from the waste heat boiler 40. One or more or any combination of high temperature shift, medium temperature shift, and low temperature shift reactors may be used.

Additional heat exchangers operatively disposed to receive the reformate 25 from the one or more shift reactors 301 may be used to remove heat from the reformate 25 and heat other process streams, for example, the hydrocarbon feedstock 71, make-up water 91, 92 and/or process condensate 240.

A trim cooler and knockout pot 321 may be used to condense most of the water out of the reformate 25 and to separate the reformate into the process condensate 240 and a water-depleted reformate 29.

The apparatus may further comprise a pressure swing adsorption unit 501. The pressure swing adsorption unit 501 may be operatively disposed to receive at least a portion of a reformate 25 discharged from the plurality of catalyst-containing reformer tubes 202. The pressure swing adsorption unit 501 may be operatively configured to separate any reformate passed thereto to form a hydrogen product gas 30 and a pressure swing adsorption unit by-product gas 36.

The present process is characterized by two operating regimes. During a first time period (i.e. from a time $t_1$ to a later time $t_2$), when the reactant gas mixture has a composition that reacts exothermically in the catalyst-containing reactor, the process comprises a first set of steps, and during a second time period (i.e. from a time $t_3$ to a later time $t_4$), when the reactant gas mixture has a composition that reacts endothermically in the catalyst-containing reactor, the process comprises a second set of steps.

During the first time period, the process comprises heating a first reactant gas mixture 73 comprising steam and a first group of hydrocarbons.

The first reactant gas mixture 73 has a composition such that when reacted in the catalyst-containing reactor 141, the first reactant gas mixture 73 reacts exothermically in the catalyst-containing reactor 141. The first reactant gas mixture 73 contains a sufficient concentration of C2+ hydrocarbons for an exothermic reaction in the catalyst-containing reactor 141. The first group of hydrocarbons includes C2+ hydrocarbons and may include methane. Whether the first reactant gas mixture 73 has a composition such that when reacted in the catalyst-containing reactor 141 is exothermic or not can be determined any number of ways. A sample of the feedstock used to make the first reactant gas mixture 73 or a sample of the first reactant gas mixture 73 can be taken and the composition measured. The composition may be known from the source of the feedstock used to form the first reactant gas mixture 73. Knowing the composition, it can be determined from basic thermodynamic calculations whether the composition will lead to an exothermic reaction in the catalyst-containing reactor 141. Alternatively, or additionally, the temperature of the first reactant gas mixture 73 entering and leaving the catalyst-containing reactor 141 can be measured. For the case where catalyst-containing reactor 141 is adiabatic reactor, an outlet temperature greater than the inlet temperature indicates an exothermic reaction in the catalyst-containing reactor 141.

The first reactant gas mixture 73 may be heated by indirect heat exchange with the combustion product gas 100. The first reactant gas mixture 73 may be heated in a first heat exchanger 205 of a plurality of heat exchangers in the heat exchanger section 204 of the reformer furnace 201.

The first reactant gas mixture 73 may be formed from steam 151 and a hydrocarbon feedstock 71. The hydrocarbon feedstock 71 for the first reactant gas mixture 73 may be naphtha or some other hydrocarbon feedstock containing hydrocarbons heavier than methane. Hydrocarbon feedstock 71 may be heated by indirect heat exchanger with reformate 25 and/or by indirect heat exchange with combustion product gas 100. Hydrogen 106 may be blended with the hydrocarbon feedstock and passed to a hydrodesulphurization unit 135 and/or hydrogenation reactor 136 to form a preconditioned hydrocarbon feedstock that is blended with steam 151. Hydrogen 106 may be supplied from hydrogen product gas 30.

During the first time period, the process comprises passing a first fraction or all of the first reactant gas mixture 73 to heat exchanger 302. The first fraction or all of the first reactant gas mixture 73 passed to heat exchanger 302 is cooled in heat exchanger 302. The first fraction or all of the first reactant gas mixture 73 passed to the heat exchanger 302 has a mass flow rate, $M_{1,HX}$. For various reactant gas mixtures having compositions that react exothermically in the catalyst-containing reactor, the relative fraction of the reactant gas mixtures passed to heat exchanger 302 generally increases with increasing exothermicity.

Any suitable stream may be used to provide cooling to the first reactant gas mixture 73 in heat exchanger 302, for example, boiler feed water, and hydrocarbon feedstock.

The first fraction or all of the first reactant gas mixture 73 may be cooled in heat exchanger 302 by indirect heat exchange with boiler feed water. Boiler feed water 127 may be passed from a steam drum 782 to heat exchanger 302 where the boiler feed water is heated thereby cooling the first fraction or all of the first reactant gas mixture 73, and the boiler feed water passed as a two-phase mixture to a steam drum 782 to make steam 125. Advantageously, boiler feed water is used to cool the first fraction or all of the first reactant gas mixture 73 so as to make additional steam. The boiler feed water temperature may be greater than the dewpoint temperature of the first reactant gas mixture 73 to avoid condensation of the first reactant gas mixture 73.

During the first time period, the process comprises passing a second fraction or none of the first reactant gas mixture 73 to bypass conduit 21 that bypasses the heat exchanger 302. The second fraction or none of the first reactant gas mixture 73 has a mass flow rate, $M_{1,BP}$, where $M_{1,BP}$ is zero when none of the first reactant gas mixture 73 is passed to the bypass conduit 21.

During the first time period, the process may comprise heating the first fraction or all of the first reactant gas mixture 73 from heat exchanger 302, and the second fraction of the first reactant gas mixture 73 from the bypass conduit 21, if nonzero, by indirect heat exchange with the combustion product gas 100. The first fraction, the second fraction, if nonzero, or all of the first reactant gas mixture 73 may be heated in a second heat exchanger 206 of the plurality of heat exchanger in the heat exchanger section 204 of the reformer furnace 201. The first fraction and the second fraction, if nonzero, may be combined and subsequently heated by indirect heat exchange with the combustion product gas 100.

During the first time period, the process comprises passing the first fraction or all of the first reactant gas mixture 73 from the heat exchanger 302 to the catalyst-containing reactor 141. As discussed above, the catalyst-containing reactor 141 may be a so-called preformer, where details are provided above. The first fraction or all of the first reactant gas mixture 73 is introduced into the catalyst-containing reactor 141 as at least a portion of a feed to the catalyst-containing reactor 141. The feed to the catalyst-containing reactor 141 has a mass flow rate, $M_{1,T}$. The first fraction or all of the first reactant gas mixture 73 is reacted in the catalyst-containing reactor 141 thereby decreasing the amount of C2+ hydrocarbons in the first reactant gas mixture 73. An effluent is withdrawn from the catalyst-containing reactor 141. The effluent contains a decreased amount of C2+ hydrocarbons compared to the first reactant gas mixture 73 and the effluent is formed from at least the first fraction or all of the first reactant gas mixture 73.

When the second fraction of the first reactant gas mixture 73 is nonzero, the process comprises passing the second fraction of the first reactant gas mixture 73 from the bypass conduit 21 to the catalyst-containing reactor 141. The second fraction of the first reactant gas mixture 73 is introduced into the catalyst-containing reactor 141 as at least another portion of the feed to the catalyst-containing reactor 141 during the first time period. The second fraction of the first reactant gas mixture 73 is reacted along with the first fraction of the first reactant gas mixture 73 in the catalyst-containing reactor 141. As a result, the effluent from the catalyst-containing reactor 141 is also formed from the second fraction of the first reactant gas mixture 73.

The first reactant gas mixture 73 (any or all) is reacted in the presence of a catalyst under reaction conditions sufficient to react the first reactant gas mixture 73. Suitable reaction conditions are known in the art. Reaction conditions sufficient to react the first reactant gas mixture 73 may include a temperature ranging from about 400° C. to about 730° C. and a pressure ranging from about 0.2 MPa to about 5.6 MPa.

The first fraction and the second fraction, if nonzero, may be combined and subsequently passed to the catalyst-containing reactor 141.

During the first time period, the process may comprise heating at least a portion of the effluent from the catalyst-containing reactor 141 formed during the first time period by indirect heat exchange with combustion product gas 100. The at least a portion of the effluent from the catalyst-containing reactor 141 may be heated in a third heat exchanger 103 of the plurality of heat exchangers in the heat exchanger section 204 of the reformer furnace 201.

During the first time period, the process comprises passing at least a portion of the effluent from the catalyst-containing reactor 141 to a reformer furnace 201. The at least a portion of the effluent may be passed from the catalyst-containing reactor 141 to the reformer furnace 201 after optional heating by indirect heat exchange with combustion product gas 100. The effluent is the effluent formed during the first time period from the at least the first fraction or all of the first reactant gas mixture 73. At least a portion of the effluent (formed during the first time period) is introduced into a plurality of catalyst-containing reformer tubes 202 in the reformer furnace 201 as a reformer feed gas mixture 15. The reformer feed gas mixture 15 is reacted in a reforming reaction under reaction conditions effective to form a reformate 25 comprising $H_2$, CO, $CH_4$, and $H_2O$. The reformate 25 formed during the first time period is withdrawn from the plurality of catalyst-containing reformer tubes 202.

The reaction conditions effective to form the reformate 25 in the plurality of catalyst-containing reformer tubes 202 may comprise a temperature ranging from 500° C. to 1000° C. and a pressure ranging from 203 kPa to 5,066 kPa (absolute). The reaction condition temperature may be as measured by any suitable temperature sensor, for example a type J thermocouple. The reaction condition pressure may be as measured by any suitable pressure sensor known in the art, for example a pressure gauge as available from Mensor.

The reformate 25 formed during the first time period may be further processed in any known unit operations to form a hydrogen-containing product gas such as industrial grade hydrogen and/or synthesis gas.

During the first time period, the process may comprise passing the reformate 25 (formed during the first time period) from the plurality of catalyst-containing reformer tubes 202 to a pressure swing adsorption (PSA) unit 501 as a pressure swing adsorption unit feed, separating the pressure swing adsorption unit feed to form a hydrogen product gas 30 and a pressure swing adsorption unit by-product gas 36, also called PSA tail gas, and PSA purge gas.

Water condensate 240 may be removed from the reformate 25 in a knock-out pot 321 prior to separating the water-depleted reformate 29 in the pressure swing adsorption unit 501.

The pressure swing adsorption unit 501 may be operated using any known pressure swing adsorption cycle. Pressure swing adsorption cycles are well-known in the art and the various steps are described for example in U.S. Pat. Appl. Pub. No. 2014/0373713, incorporated herein by reference. Specific pressure swing adsorption cycles are provided in companion articles "Pressure Swing Adsorption cycles for 4 to 7 adsorption beds," IP.com number 000241449, Apr. 29, 2015, and "Pressure Swing Adsorption cycles for 7 or more adsorption beds," IP.com number 000241619, May 18, 2015.

During the first time period, the process comprises combusting a first quantity of fuel 35, 36 with a first quantity of oxidant gas 99 in a combustion section 203 of the reformer furnace 201 external to the plurality of catalyst-containing reformer tubes 202. The fuel 35, 36 is combusted with oxidant gas 99 (i.e. combustion air) under conditions effective to combust the fuel 35, 36 to form a first quantity of combustion product gas 100 comprising $CO_2$ and $H_2O$. Combustion of the fuel generates heat to supply energy for reacting the reformer feed gas mixture 15 inside the plurality of catalyst-containing reformer tubes 202. The first quantity of the combustion product gas 100 is withdrawn from the combustion section 203 of the reformer furnace and passed to the heat exchanger section 204 of the reformer furnace 201.

The first quantity of fuel 35, 36 may comprise pressure swing adsorption unit by-product gas 36 and a supplemental fuel 35. By-product gas from a pressure swing adsorption unit is often called pressure swing adsorber tail gas, and supplemental fuel is often called trim fuel, which may be natural gas or other suitable trim fuel. The pressure swing adsorption unit by-product gas 36 may be heated by indirect heat exchange in heat exchanger 515 as is known in the art. Heating pressure swing adsorption unit by-product gas is known from U.S. Pat. No. 8,187,363, and also from earlier publications WO2007/020514A2, U.S. Pat. Nos. 7,377,951, and 7,850,944.

By-product gas 36 and supplemental fuel 35 may be blended and introduced together through a burner to the combustion section 203, or they may be introduced separately through different ports in the burner. Alternatively, the by-product gas 36 may be introduced through the primary burner and the supplemental fuel 35 may be introduced through lances near the burner.

Any suitable burner may be used to introduce the fuel 35, 36 and the oxidant gas 99 into the combustion section 203. Combustion of the fuel 35, 36 with the oxidant gas 99 generates heat to supply energy for reacting the reformer feed gas mixture 15 inside the plurality of catalyst-containing reformer tubes 202. The combustion product gas 100 is withdrawn from the combustion section 203 of the reformer furnace 201 and passed to the convection section 204 of the reformer furnace 201 to supply heat to other process streams. The combustion section 203 (also called the radiant, radiation, or radiative section) of the reformer furnace is that part of the reformer furnace containing the plurality of catalyst-containing reformer tubes 202. The heat exchanger section 204, also called the convection section, of the reformer furnace is that part of the reformer furnace containing heat exchangers other than the plurality of catalyst-containing reformer tubes. The heat exchangers in the heat exchanger section may be for heating process fluids other than reformate from the plurality of catalyst-containing reformer tubes, such as water/steam, air, pressure swing adsorption unit by-product gas, reformer feed gas mixture prior to introduction into the catalyst-containing reformer tubes, prereformed reformer feed gas, etc.

Furnace conditions effective to combust the fuel may comprise a furnace temperature ranging from 600° C. to 1500° C. and a pressure ranging from 98 kPa to 101.4 kPa (absolute). Actual flame temperatures are generally higher. The temperature may be as measured by a thermocouple, an optical pyrometer, or any other calibrated temperature measurement device known in the art for measuring furnace temperatures. The pressure may be as measured by any suitable pressure sensor known in the art, for example a pressure gauge as available from Mensor.

The oxidant gas 99 may be heated in heat exchanger 214 as is known in the art.

The oxidant gas 99 is a gas containing oxygen and may be air, oxygen-enriched air, oxygen-depleted air such as gas turbine exhaust, industrial grade oxygen, or any other oxygen-containing gas known for use in a reformer furnace for combustion. For example, as shown in the FIGURE, air 90 may be compressed in forced draft fan 212, heated in heat exchanger 214, and passed to the reformer furnace 201 as oxidant gas 99.

Combustion product gas 100 may heat a number of different process streams in the heat exchanger section 204 of the reformer furnace 201. The combustion product gas 100 may heat the streams in various different configurations (order of heating), passed to an induced draft fan 211, and exhausted.

During the second time period, the process comprises heating a second reactant gas mixture 73' comprising steam and a second group of hydrocarbons.

The second reactant gas mixture 73' has a composition such that when reacted in the catalyst-containing reactor 141, the second reactant gas mixture 73' reacts endothermically in the catalyst-containing reactor 141. The second reactant gas mixture 73' contains a sufficiently low concentration of C2+ hydrocarbons resulting in an endothermic reaction in the catalyst-containing reactor 141. The second group of hydrocarbons may include primarily methane and may include some C2+ hydrocarbons. The second reactant gas mixture 73' may be formed from steam and natural gas. Whether the second reactant gas mixture 73' has a composition such that when reacted in the catalyst-containing reactor 141 is endothermic or not can be determined any number of ways. A sample of the feedstock used to make the second reactant gas mixture 73' or a sample of the second reactant gas mixture 73' can be taken and the composition measured. The composition may be known from the source of the feedstock used to form the second reactant gas mixture 73'. Knowing the composition, it can be determined from basic thermodynamic calculations whether the composition will lead to an endothermic reaction in the catalyst-containing reactor 141. Alternatively, or additionally, the temperature of the second reactant gas mixture 73' entering and leaving the catalyst-containing reactor 141 can be measured. For the case where catalyst-containing reactor 141 is adiabatic reactor, an outlet temperature less than the inlet temperature indicates an endothermic reaction in the catalyst-containing reactor 141.

The second reactant gas mixture 73' may be heated by indirect heat exchange with the combustion product gas 100. The second reactant gas mixture 73' may be heated in the first heat exchanger 205 of the plurality of heat exchangers in the heat exchanger section 204 of the reformer furnace 201.

The second reactant gas mixture 73' may be formed from steam 151 and a hydrocarbon feedstock 71, which has a different composition than the feedstock during the first time period. The hydrocarbon feedstock 71 for the second reactant gas mixture 73' may be natural gas or some other hydrocarbon feedstock containing primarily methane. Hydrocarbon feedstock 71 may be heated by indirect heat exchange with reformate 25 and/or by indirect heat exchange with combustion product gas 100. Hydrogen 106 may be blended with the hydrocarbon feedstock and passed to a hydrodesulphurization unit 135 and/or hydrogenation reactor 136 to form a preconditioned hydrocarbon feedstock 72 that is blended with steam 151. Hydrogen 106 may be supplied from hydrogen product gas 30.

During the second time period, the process comprises passing a first fraction or all of the second reactant gas mixture 73' through the bypass conduit 21 that bypasses the heat exchanger 302. The first fraction of the second reactant gas mixture 73' has a mass flow rate, $M_{2,BP}$.

During the second time period, the process comprises passing a second fraction or none of the second reactant gas mixture 73' after heating (e.g. in heat exchanger 205) to the heat exchanger 302. The second fraction or none of the second reactant gas mixture 73' has a mass flow rate, $M_{2,HX}$, where $M_{2,HX}$, is zero when none of the second reactant gas mixture 73' is passed to the heat exchanger 302. When the second fraction is nonzero, the second fraction of the second reactant gas mixture 73' is cooled in the heat exchanger 302. The second fraction of the second reactant gas mixture 73' may be cooled in heat exchanger 302 by indirect heat exchange with boiler feed water, where the boiler feed water is passed to a steam drum 782 to make steam as described above for cooling the first fraction of the first reactant gas mixture 73. The second fraction of the second reactant gas mixture 73' may be cooled by other streams as well, as described above for cooling the first fraction of the first reactant gas mixture 73.

During the second time period, the process may comprise heating the first fraction or all of the second reactant gas mixture 73' from bypass conduit 21, and the second fraction of the second reactant gas mixture 73' from heat exchanger 302, if nonzero, by indirect heat exchange with the combustion product gas 100. The first fraction, the second fraction, if nonzero, or all of the second reactant gas mixture 73' may be heated in second heat exchanger 206 of the plurality of heat exchanger in the heat exchanger section 204 of the reformer furnace 201. The first fraction and the second fraction, if nonzero, may be combined and subsequently heated by indirect heat exchange with the combustion product gas 100.

During the second time period, the process comprises passing the first fraction or all of the second reactant gas mixture 73' from the bypass conduit 21 to the catalyst-containing reactor 141. The first fraction or all of the second reactant gas mixture 73' is introduced into the catalyst-containing reactor 141 as at least a portion of a feed to the catalyst-containing reactor 141. The feed to the catalyst-containing reactor 141 has a mass flow rate, $M_{2,T}$. The first fraction or all of the second reactant gas mixture 73' is reacted in the catalyst-containing reactor 141 under suitable reaction conditions, and an effluent formed from at least the first fraction or all of the second reactant gas mixture 73' is withdrawn from the catalyst-containing reactor 141.

When the second fraction of the second reactant gas mixture 73' is nonzero, the process comprises passing the second fraction of the second reactant gas mixture 73' from the heat exchanger 302 to the catalyst-containing reactor 141. The second fraction of the second reactant gas mixture 73' is introduced into the catalyst-containing reactor 141 as at least another portion of the feed to the catalyst-containing reactor 141 during the second time period. The second fraction of the second reactant gas mixture 73' is reacted in the catalyst-containing reactor 141. As a result, the effluent from the catalyst-containing reactor 141 is also formed from the second fraction of the second reactant gas mixture 73'.

The second reactant gas mixture 73' (any or all) is reacted in the presence of a catalyst under reaction conditions sufficient to react the second reactant gas mixture 73'. Suitable reaction conditions are known in the art. Reaction conditions sufficient to react the second reactant gas mixture 73' may include a temperature ranging from about 400° C. to about 730° C. and a pressure ranging from about 0.2 MPa to about 5.6 MPa.

The first fraction and the second fraction, if nonzero, may be combined and subsequently passed to the catalyst-containing reactor 141.

During the second time period, the process may comprise heating at least a portion of the effluent from the catalyst-containing reactor 141 formed during the second time period by indirect heat exchange with the combustion product gas 100. The at least a portion of the effluent from the catalyst-containing reactor 141 may be heated in the third heat exchanger 103 of the plurality of heat exchangers in the heat exchanger section 204 of the reformer furnace 201.

During the second time period, the process comprises passing at least a portion of the effluent formed during the second time period from the catalyst-containing reactor 141 to the reformer furnace 201. The at least a portion of the effluent may be passed from the catalyst-containing reactor 141 to the reformer furnace 201 after optional heating by indirect heat exchange with combustion product gas 100. The effluent is the effluent formed during the second time period from the at least the first fraction or all of the second reactant gas mixture 73'. The at least a portion of the effluent formed during the second time period is introduced into a plurality of catalyst-containing reformer tubes 202 in the reformer furnace 201 as a reformer feed gas mixture 15. The reformer feed gas mixture 15 is reacted under reaction conditions effective to form a reformate 25 comprising $H_2$, CO, $CH_4$, and $H_2O$. The reformate 25 formed during the second time period is withdrawn from the plurality of catalyst containing reformer tubes 202.

The reaction conditions effective to form the reformate 25 in the plurality of catalyst-containing reformer tubes 202 may comprise a temperature ranging from 500° C. to 1000° C. and a pressure ranging from 203 kPa to 5,066 kPa (absolute). The reaction condition temperature may be as measured by any suitable temperature sensor, for example a type J thermocouple. The reaction condition pressure may be as measured by any suitable pressure sensor known in the art, for example a pressure gauge as available from Mensor.

The reformate 25 formed during the second time period may be further processed by any known means to form a hydrogen-containing product gas such as industrial grade hydrogen and/or synthesis gas.

During the second time period, the process may comprise passing the reformate 25 (formed during the second time period) from the plurality of catalyst-containing reformer tubes 202 to a pressure swing adsorption unit 501 as a pressure swing adsorption unit feed, separating the pressure swing adsorption unit feed to form a hydrogen product gas 30 and a pressure swing adsorption unit by-product gas 36. The description for pressure swing adsorption provided for the first time period applies mutatis mutandis to the second time period.

During the second time period, the process further comprises combusting a second quantity of fuel 35, 36 with a second quantity of oxidant gas 99 in the combustion section 203 of the reformer furnace 201 external to the plurality of catalyst-containing reformer tubes 202. The fuel 35, 36 and oxidant gas 99 (i.e. combustion air) are combusted under conditions effective to combust the second quantity of fuel 35, 36 to form a second quantity of combustion product gas 100. Combustion of the fuel generates heat to supply energy for reacting the reformer feed gas mixture 15 inside the plurality of catalyst-containing reformer tubes 202 during the second time period. The second quantity of combustion product gas 100 is withdrawn from the combustion section 203 of the reformer furnace 201 and passed to the heat exchanger section 204 of the reformer furnace 201.

The second quantity of fuel 35, 36 may comprise pressure swing adsorption unit by-product gas 36 and a trim fuel 35, which may be natural gas or other suitable trim fuel. The pressure swing adsorption unit by-product gas 36 may be heated by indirect heat exchange in heat exchanger 515 as is known in the art.

The second quantity of oxidant gas 99 may be heated in heat exchanger 214.

The description of the reformer furnace, furnace operating conditions, and burners provided for the first time period applies mutatis mutandis to the second time period.

The process is characterized by a greater fraction of reactant gas mixture being passed to heat exchanger 302 and a smaller fraction bypassing heat exchanger 302 when the composition of the feed to the catalyst-containing reactor 141 is such that the reaction in the catalyst-containing reactor 141 is exothermic (i.e. during the first time period) than when the composition of the feed to the catalyst-containing reactor 141 is such that the reaction in the catalyst-containing reactor 141 is endothermic (i.e. during the second time period). Stated another way, the ratio $$\left(\frac{M_{1,HX}}{M_{1,T}}\right)$$

of the mass flow rate of the first fraction or all of the first reactant gas mixture 73 passed to the heat exchanger 302 to the total mass flow of the feed to the catalyst-containing reactor 141 during the first time period is greater than the ratio $$\left(\frac{M_{2,HX}}{M_{2,T}}\right)$$

of the mass flow rate of the second fraction or none of the second reactant gas mixture 73' passed to the heat exchanger 302 to the total mass flow rate of the feed to the catalyst-containing reactor 141 during the second time period, i.e. $\frac{M_{1,HX}}{M_{1,T}} > \frac{M_{2,HX}}{M_{2,T}}$.

The process may include control features.

The process may comprise determining that the first reactant gas mixture 73 has a composition such that when reacted in the catalyst-containing reactor 141, the first reactant gas mixture 73 reacts exothermically, and initiating the steps for the first time period responsive to determining that the first reactant gas mixture 73 has a composition such that when reacted in the catalyst-containing reactor 141, the first reactant gas mixture 73 reacts exothermically.

The process may comprise determining that the second reactant gas mixture 73' has a composition such that when reacted in the catalyst-containing reactor 141, the second reactant gas mixture 73' reacts endothermically, and initiating the steps for the second time period responsive to determining that the second reactant gas mixture 73' has a composition such that when second reactant gas mixture 73' is reacted in the catalyst-containing reactor 141, the second reactant gas mixture 73' reacts endothermically.

The process may operate during additional time periods. During each of the additional time periods, the process may operate in a manner similar to operation during the first time period or the second time period depending on the composition of the reactant gas mixture and associated endothermicity or exothermicity.

EXAMPLES

Aspen Plus® by Aspen Technology, Inc. was used to simulate the process using naphtha or natural gas feed using the process and apparatus of the present disclosure and also without the heat exchanger 302. In each of the examples, the same amount of hydrogen is produced.

The thermal energy consumption for hydrogen production for various processes can be compared using the net specific energy (NSE) having units $J/Nm^3$, which can be defined $$NSE = \frac{HHV_{fuel} * F_{fuel} + HHV_{feed} * F_{feed} - \Delta H * F_{steam}}{HPR},$$

where
$HHV_{fuel}$ is the higher heating value of the supplemental fuel introduced into the combustion section ($J/Nm^3$),
$F_{fuel}$ is the flow rate of the fuel ($Nm^3/h$),
$HHV_{feed}$ is the higher heating value of the reformer feedstock introduced into the reformer ($J/Nm^3$),
$F_{feed}$ is the flow rate of the reformer feedstock ($Nm^3/h$),
$\Delta H$ is the enthalpy difference between the export steam and water at 25° C. (J/kg),
$F_{steam}$ is the mass flow of the export steam (kg/h), and
HPR is the hydrogen production rate ($Nm^3/h$).

The thermal energy consumption is compared in the examples to show the benefit of the present invention.

Example 1—Natural Gas Feed-Comparative Case

For the example 1 simulation, natural gas feed is combined with steam to form a reactant gas mixture having a typical steam-to-carbon molar ratio used for natural gas feed. In example 1, heat exchanger 302 is omitted. The reactant gas mixture is heated in heat exchanger 205, heated in heat exchanger 206 and passed to the catalyst-containing reactor 141. In reactor 141, the reactant gas mixture reacts endothermically and the temperature of the reactant gas mixture decreases by 77° C. The reactant gas mixture is passed to heat exchanger 103 where it is heated and then introduced as a reformer feed gas mixture into the plurality of catalyst-containing reformer tubes 202. The reformer feed gas mixture is reacted in the plurality of catalyst-containing reformer tubes 202 to form a reformate that is processed to form product hydrogen.

Example 2—Naphtha Feed-Comparative Case

For the example 2 simulation, naphtha feed is combined with steam to form a reactant gas mixture having a steam-to-carbon molar ratio 0.2 greater than for example 1 using natural gas feed. A higher steam-to-carbon molar ratio is used for naphtha compared to natural gas since naphtha has a greater tendency to form carbon on the reformer catalyst. Heat exchangers 205, 206, and 103 in examples 1 and 2 have the same heat transfer areas and heat transfer coefficients.

The reactant gas mixture is heated in heat exchanger 205, heated in heat exchanger 206 and passed to the catalyst-containing reactor 141. The temperature of the reactant gas mixture in example 2 is 13° C. less than in example 1. In reactor 141, the reactant gas mixture reacts exothermically and the temperature of the reactant gas mixture increases by 17° C. The reactant gas mixture is passed to heat exchanger 103 where it is heated to a temperature exceeding a desired target temperature by 13° C. and is introduced as a reformer feed gas mixture into the plurality of catalyst-containing reformer tubes 202. The reformer feed gas mixture is reacted in the plurality of catalyst-containing reformer tubes 202 to form a reformate that is processed to form product hydrogen.

Changing the heat transfer characteristics for heat exchangers 205, 206, and 103 to avoid exceeding the desired target temperature for naphtha operation would degrade the thermal energy efficiency for operation with natural gas.

Example 3—Natural Gas Feed

For the example 3 simulation, natural gas feed is combined with steam to form a reactant gas mixture having the steam-to-carbon molar ratio as example 1. In example 3, heat exchanger 302 is included. By including heat exchanger 302, the system can be designed to permit a higher inlet temperature to the catalyst-containing reactor 141 for operation on natural gas and still be able to process naphtha. The inlet temperature to the catalyst-containing reactor 141 is 34° C. greater than for example 1. The reactant gas mixture is heated in heat exchanger 205, cooled in heat exchanger 302, heated in heat exchanger 206 and passed to the catalyst-containing reactor 141. In reactor 141, the reactant gas mixture reacts endothermically and the temperature of the reactant gas mixture decreases by 77° C. The reactant gas mixture is passed to heat exchanger 103 where it is heated and then introduced as a reformer feed gas mixture into the plurality of catalyst-containing reformer tubes 202. The reformer feed gas mixture is reacted in the plurality of catalyst-containing reformer tubes 202 to form a reformate that is processed to form product hydrogen.

The thermal energy consumption for example 3 using natural gas feed is 0.3% less than the thermal energy consumption for example 1 using natural gas feed.

Example 4—Naphtha Feed

For the example 4 simulation, naphtha feed is combined with steam to form a reactant gas mixture having the same steam-to-carbon molar ratio as example 2. Heat exchangers 205, 302, 206, and 103 in examples 3 and 4 have the same heat transfer areas and heat transfer coefficients.

The reactant gas mixture is heated in heat exchanger 205, cooled in heat exchanger 302, heated in heat exchanger 206 and passed to the catalyst-containing reactor 141. Through the use of heat exchanger 302, the inlet temperature to the catalyst-containing reactor 141 is reduced by 53° C. compared to example 3 with natural gas. In reactor 141, the reactant gas mixture reacts exothermically and the temperature of the reactant gas mixture increases by 19° C. The reactant gas mixture is passed to heat exchanger 103 where it is heated to the desired target temperature and introduced as a reformer feed gas mixture into the plurality of catalyst-containing reformer tubes 202. The reformer feed gas mixture is reacted in the plurality of catalyst-containing reformer tubes 202 to form a reformate that is processed to form product hydrogen.

The thermal energy consumption for example 4 is the same as the energy consumption for example 2 for naphtha feed. However, the temperature of the reformer feed gas mixture can be maintained at the desired target temperature using heat exchanger 302, whereas without heat exchanger 302, the reformer feed gas mixture exceeds the desired target temperature by 13° C. as shown in example 2.

These examples show that an improved energy efficiency is obtained using heat exchanger 302 for natural gas feed while avoiding excessive temperatures for the reformer feed gas mixture for naphtha feed.

I claim:

1. A process for producing a hydrogen-containing product,
wherein during a first time period, the process comprises:
heating a first reactant gas mixture comprising steam and a first group of hydrocarbons;
passing a first fraction or all of the first reactant gas mixture after heating to a heat exchanger thereby cooling the first fraction or all of the first reactant gas mixture in the heat exchanger, the first fraction or all of the first reactant gas mixture passed to the heat exchanger having a mass flow rate, $M_{1,HX}$;
passing a second fraction or none of the first reactant gas mixture after heating to a bypass conduit that bypasses the heat exchanger, the second fraction or none of the first reactant gas mixture having a mass flow rate, $M_{1,BP}$, where $M_{1,BP}$ is zero when none of the first reactant gas mixture is passed to the bypass conduit;
passing the first fraction or all of the first reactant gas mixture from the heat exchanger to the prereforming catalyst-containing reactor, introducing the first fraction or all of the first reactant gas mixture into the prereforming catalyst-containing reactor as at least a portion of a feed to the prereforming catalyst-containing reactor, the feed to the prereforming catalyst-containing reactor having a mass flow rate, $M_{1,T}$, reacting the first fraction or all of the first reactant gas mixture in the prereforming catalyst-containing reactor, and withdrawing an effluent formed from at least the first fraction or all of the first reactant gas mixture from the prereforming catalyst-containing reactor;
passing at least a portion of the effluent from the prereforming catalyst-containing reactor to a reformer furnace, introducing the at least a portion of the effluent into a plurality of catalyst-containing reformer tubes in the reformer furnace as a reformer feed gas mixture, reacting the reformer feed gas mixture in a reforming reaction under reaction conditions effective to form a reformate comprising $H_2$, CO, CH$_4$, and H$_2$O, and withdrawing the reformate from the plurality of catalyst containing reformer tubes;

combusting a first quantity of fuel with a first quantity of oxidant gas in a combustion section of the reformer furnace external to the plurality of catalyst-containing reformer tubes under conditions effective to combust the fuel to form a first quantity of combustion product gas and generate heat to supply energy for reacting the reformer feed gas mixture inside the plurality of catalyst-containing reformer tubes, and withdrawing the first quantity of the combustion product gas from the combustion section;

wherein during a second time period, the process comprises:

heating a second reactant gas mixture comprising steam and a second group of hydrocarbons;

passing a first fraction or all of the second reactant gas mixture after heating through the bypass conduit that bypasses the heat exchanger, the first fraction of the second reactant gas mixture having a mass flow rate, M$_{2,BP}$;

passing a second fraction or none of the second reactant gas mixture after heating to the heat exchanger, the second fraction or none of the second reactant gas mixture having a mass flow rate, M$_{2,HX}$, where M$_{2,HX}$ is zero when none of the second reactant gas mixture is passed to the heat exchanger, wherein the second fraction of the second reactant gas mixture is cooled in the heat exchanger if the second fraction is passed to the heat exchanger;

passing the first fraction or all of the second reactant gas mixture from the bypass conduit to the prereforming catalyst-containing reactor, introducing the first fraction or all of the second reactant gas mixture into the prereforming catalyst-containing reactor as at least a portion of a feed to the prereforming catalyst-containing reactor, the feed to the prereforming catalyst-containing reactor having a mass flow rate, M$_{2,T}$, reacting the first fraction or all of the second reactant gas mixture in the prereforming catalyst-containing reactor, and withdrawing an effluent formed from at least the first fraction or all of the second reactant gas mixture from the prereforming catalyst-containing reactor;

passing at least a portion of the effluent from the prereforming catalyst-containing reactor to the reformer furnace, introducing the at least a portion of the effluent into a plurality of catalyst-containing reformer tubes in the reformer furnace as a reformer feed gas mixture, reacting the reformer feed gas mixture under reaction conditions effective to form a reformate comprising H$_2$, CO, CH$_4$, and H$_2$O, and withdrawing the reformate from the plurality of catalyst containing reformer tubes; and combusting a second quantity of fuel with a second quantity of oxidant gas in the combustion section of the reformer furnace external to the plurality of catalyst-containing reformer tubes under conditions effective to combust the second quantity of fuel to form a second quantity of combustion product gas and generate heat to supply energy for reacting the reformer feed gas mixture inside the plurality of catalyst-containing reformer tubes, and withdrawing the second quantity of the combustion product gas from the combustion section;

wherein the first reactant gas mixture has a composition such that when reacted in the prereforming catalyst-containing reactor, the first reactant gas mixture reacts exothermically;

wherein the second reactant gas mixture has a composition such that when reacted in the prereforming catalyst-containing reactor, the second reactant gas mixture reacts endothermically; and wherein $$\frac{M_{1,HX}}{M_{1,T}} > \frac{M_{2,HX}}{M_{2,T}}.$$

2. The process of claim 1 wherein during the first time period the process further comprises:

passing the second fraction of the first reactant gas mixture from the bypass conduit to the prereforming catalyst-containing reactor, introducing the second fraction of the first reactant gas mixture into the prereforming catalyst-containing reactor as at least another portion of the feed to the prereforming catalyst-containing reactor, reacting the second fraction of the first reactant gas mixture in the prereforming catalyst-containing reactor, wherein the effluent from the prereforming catalyst-containing reactor is also formed from the second fraction of the first reactant gas mixture.

3. The process of claim 1 wherein during the second time period the process further comprises:

passing the second fraction of the second reactant gas mixture from the heat exchanger to the prereforming catalyst-containing reactor, introducing the second fraction of the second reactant gas mixture into the prereforming catalyst-containing reactor as at least another portion of the feed to the prereforming catalyst-containing reactor, reacting the second fraction of the second reactant gas mixture in the prereforming catalyst-containing reactor, wherein the effluent from the prereforming catalyst-containing reactor is also formed from the second fraction of the second reactant gas mixture.

4. The process of claim 1
wherein the first fraction or all of the first reactant gas mixture is cooled in the heat exchanger by indirect heat exchange with boiler feed water.

5. The process of claim 1
wherein when passing the first fraction or all of the first reactant gas mixture from the heat exchanger to the prereforming catalyst-containing reactor, the first fraction or all of the first reactant gas mixture is heated by indirect heat exchange with the combustion product gas;

wherein when passing the second fraction of the first reactant gas mixture, if nonzero, from the bypass conduit to the prereforming catalyst-containing reactor, the second fraction of the first reactant gas mixture is heated by indirect heat exchange with the combustion product gas;

wherein when passing the first fraction or all of the second reactant gas mixture from the bypass conduit to the prereforming catalyst-containing reactor, the first fraction or all of the second reactant gas mixture is heated by indirect heat exchange with the combustion product gas; and wherein when passing the second fraction of the second reactant gas mixture, if nonzero, from the heat exchanger to the prereforming catalyst-containing reactor, the second fraction of the second reactant gas mixture is heated by indirect heat exchange with the combustion product gas.

6. The process of claim 1 wherein when the at least a portion of the effluent from the prereforming catalyst-containing reactor is passed from the prereforming catalyst-containing reactor to the reformer furnace, the at least a portion of the effluent from the prereforming catalyst-containing reactor is heated by indirect heat exchange with the combustion product gas.

7. The process of claim 1 wherein when the at least a portion of the effluent from the prereforming catalyst-containing reactor is passed from the prereforming catalyst-containing reactor to the reformer furnace, the at least a portion of the effluent from the prereforming catalyst-containing reactor is heated by indirect heat exchange with the combustion product gas.

8. The process of claim 1 further comprising:
passing the reformate from the plurality of catalyst-containing reformer tubes to a pressure swing adsorption unit as a pressure swing adsorption unit feed, separating the pressure swing adsorption unit feed to form a hydrogen product gas and a pressure swing adsorption unit by-product gas.

9. The process of claim 1 further comprising:
passing the reformate from the plurality of catalyst-containing reformer tubes to a pressure swing adsorption unit as a pressure swing adsorption unit feed, separating the pressure swing adsorption unit feed to form a hydrogen product gas and a pressure swing adsorption unit by-product gas.

10. The process of claim 1 further comprising:
at least one of (i) determining that the first reactant gas mixture has a composition such that when reacted in the prereforming catalyst-containing reactor, the first reactant gas mixture reacts exothermically, and initiating the steps for the first time period responsive to determining that the first reactant gas mixture has a composition such that when reacted in the prereforming catalyst-containing reactor, the first reactant gas mixture reacts exothermically, and (ii) determining that the second reactant gas mixture has a composition such that when reacted in the prereforming catalyst-containing reactor, the second reactant gas mixture reacts endothermically, and initiating the steps for the second time period responsive to determining that the second reactant gas mixture has a composition such that when second reactant gas mixture is reacted in the prereforming catalyst-containing reactor, the second reactant gas mixture reacts endothermically.

* * * * *